Sept. 18, 1923.                T. LENGYEL                1,468,311
                                FOOD GRATER
                              Filed May 11, 1923
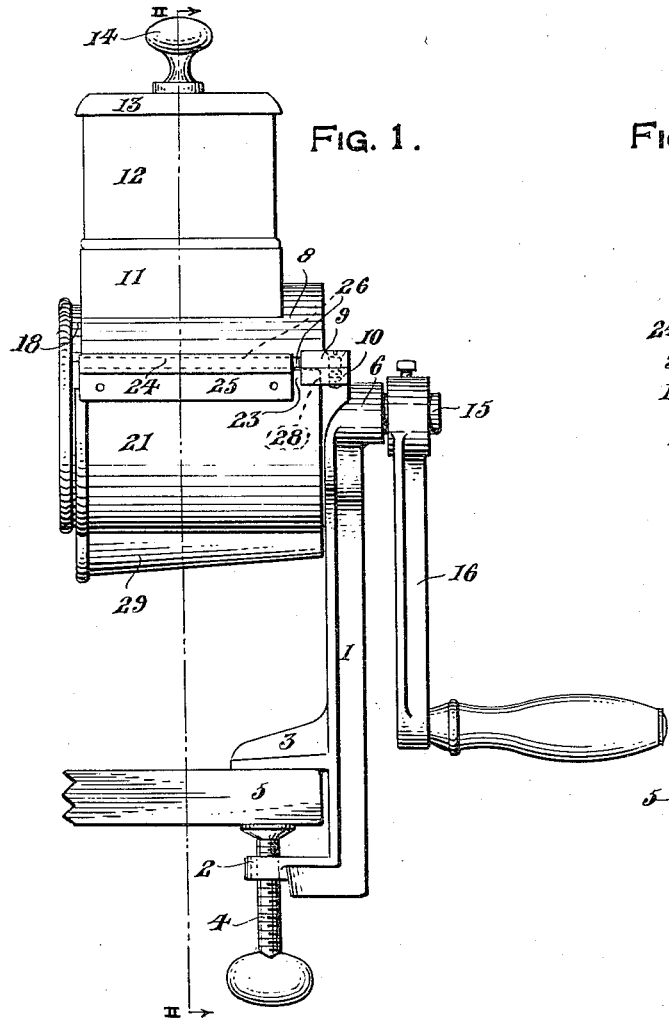
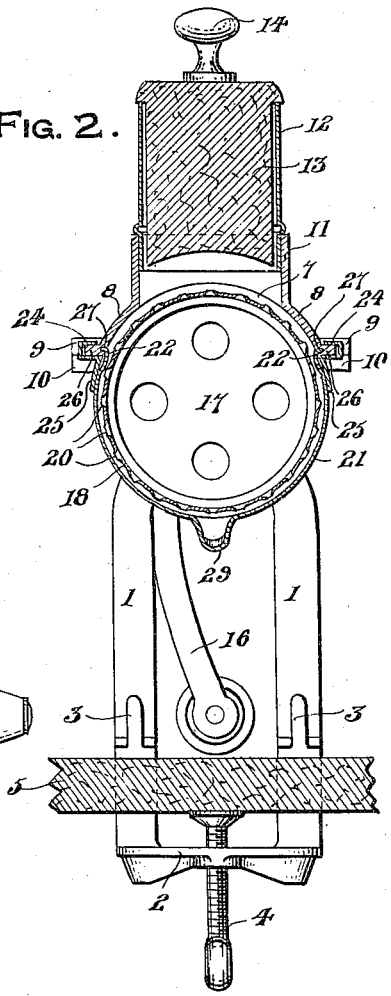
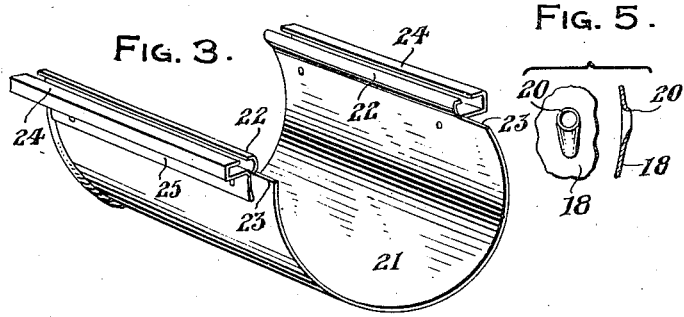
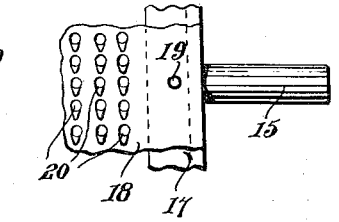
Inventor
T. Lengyel
By
F. T. Bryant
Attorney Patented Sept. 18, 1923.

1,468,311

UNITED STATES PATENT OFFICE.

THOMAS LENGYEL, OF BUFFALO, NEW YORK.

FOOD GRATER.

Application filed May 11, 1923. Serial No. 638,378.

*To all whom it may concern:*

Be it known that I, THOMAS LENGYEL, a citizen of the United States of America, residing at Buffalo, in the county of Erie and State of New York, have invented certain new and useful Improvements in Food Graters, of which the following is a specification.

This invention relates to certain new and useful improvements in food graters and has for one of its objects to provide a grater of the rotary type wherein a receptacle disposed above the rotatable grating drum or cylinder has a follower block slidable therein for forcing the vegetables into engagement with the grating cylinder.

Another object of the invention is to provide a vegetable grater wherein a frame structure in the form of a casting removably supports a hopper, a grating cylinder and a guide pan for directing the material in being discharged from the grater, the removability of these elements facilitating the cleaning operation thereof and rendering the device highly sanitary.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a side elevational view of a vegetable grater constructed in accordance with the present invention, the same being illustrated as operatively mounted upon a support such as a table or the like, Figure 2 is a vertical cross-sectional view taken on line II—Il of Fig. 1 showing the removable mounting of the guide pan on the grater casting or frame, the removable hopper and the follower block, Figure 3 is a perspective view of the guide pan removed from the grater frame, Figure 4 is a fragmentary side elevational view showing a portion of the grating cylinder and the bearing shaft and supporting disk therefor, and Figure 5 shows fragmentary side and sectional views of a portion of the grating cylinder illustrating the cutting or grating teeth formed thereon.

The vegetable grater embodies a frame, preferably in the form of a casting having vertical side bars 1 connected at their lower ends by a laterally offset cross bar 2, corresponding sides of the legs 1 carrying brackets 3 while a screw clamp 4 threaded through the cross bar 2 cooperates with the brackets 3 for clamping the grater frame upon a table side or other support, the upper ends of the side bars 1 converge and merge into a bearing 6 that carries a disk head 7 upon one end thereof, a laterally directed transversely curved bracket 8 carrying rear corner lugs 9 that are bolted to cooperating lugs 10 carried by the disk head 7.

The bracket 8 carries a centrally positioned upwardly directed rectangular frame 11 within the upper end of which, the lower end of a rectangular receptacle 12 is removably received, a relatively large follower block 13 provided with a handle 14 at its upper end being slidable in the receptacle 12 for forcing vegetables downwardly therethrough as will be obvious from an inspection of Fig. 2.

A stub shaft 15 is journaled in the bearing 6 at the upper ends of the frame bars 1 and project from each end of the bearing, one end of the stub shaft having a crank handle 16 detachably connected thereto while a disk head 17 is permanently carried by the other end of the stub shaft and is disposed beneath the arched bracket 8. A grating cylinder 18 open at each end has one open end thereof enclosing the disk head 17 as shown in Fig. 4 and is secured thereto at spaced points as at 19, the entire surface of the grating cylinder 18 being provided with outwardly struck grating teeth 20 of the form shown in Fig. 5 while the mounting of the grating cylinder positions the same directly beneath the receptacle 12.

A guide pan 21 of the type illustrated in detail in Fig. 3 is associated with the bracket 8 and frame lugs 10, the guide pan 21 being substantially semi-circular in end elevation and formed at its upper side edges with outwardly curved resilient flanges 22 that terminate at points spaced from the inner edge of the guide pan as shown at 23. A U-shaped channel bar 24 carries a depending flange 25 at one edge thereof that is secured to the upper edge of the guide pan 21, a channel bar being associated with each upper edge of the guide pan with the open side thereof facing the resilient flange 22. Each side edge of the arched bracket 8 carries an outwardly directed rib 26 while a longitudinal groove 27 is formed in the inner side of each rib as shown in Fig. 2. In mounting the guide pan 21 upon the arched bracket 8, the channel bars 24 enclose the bracket ribs 26 and the edges of the resilient flanges 22 extend into the rib grooves 27, the guide pan being slidably mounted upon the bracket plate with the inner upper corner edges 23 thereof received in grooves 28 formed in the lugs 10 and illustrated by dotted lines in Fig. 1, the resiliency of the flanges 22 cooperating with the channel bars 24 for frictionally retaining the guide pan in position upon the arched bracket 8. To facilitate discharge of grated vegetables from the device, the lower side of the guide pan is provided with a depressed channel 29 that discharges at the forward end of the grating cylinder and guide pan as shown in Fig. 1.

In the operation of the device, the follower block 13 is removed from the receptacle 12 and vegetables to be grated are placed therein, the follower block being then mounted in the receptacle and forcibly engaging the vegetables to move the same into engagement with the grating cylinder 18. The grating cylinder is rotated through the medium of the crank handle 16 and the grated vegetables will fall into the grating cylinder and delivery channel 27 for discharge at the front end of the device, the inclined channel 27 facilitating the discharge of liquid from the device. The several parts of the grater are easily separated for purposes of cleaning or the like and when assembled presents a substantial and rigid construction efficiently operating for the purposes intended.

While there is herein shown and described the preferred embodiment of the present invention, it is nevertheless to be understood that minor changes may be made therein without departing from the spirit and scope of the invention as claimed.

What is claimed as new is:—

1. In a vegetable grater, a frame, a hopper receptacle, guide pan and grating cylinder detachably mounted thereon, and means for rotating the grating cylinder, said frame including a lateral arched bracket, an upstanding rectangular frame carried thereby for the removable reception of the hopper receptacle, said grating cylinder including a journalled stub shaft supporting the grating cylinder at one end and the rotating means at the other end.

2. In a vegetable grater, a frame, a hopper receptacle, guide pan and grating cylinder detachably mounted thereon, means for rotating the grating cylinder, said frame including a lateral arched bracket, an upstanding rectangular frame carried thereby for the removable reception of the hopper receptacle, said grating cylinder including a journalled stub shaft supporting the grating cylinder at one end and the rotating means at the other end, companion lugs carried by the frame and bracket for securing the bracket to the frame and a slidable tensioned connection between the bracket and guide pan.

3. In a vegetable grater, a frame, a hopper receptacle, guide pan and grating cylinder detachably mounted thereon, means for rotating the grating cylinder, said frame including a lateral arched bracket, an upstanding rectangular frame carried thereby for the removable reception of the hopper receptacle, said grating cylinder including a journalled stub shaft supporting the grating cylinder at one end and the rotating means at the other end, companion lugs carried by the frame and bracket for securing the bracket to the frame, a slidable tensioned connection between the bracket and the guide pan including side ribs carried by the bracket having slots in the inner edges, channel bars carried by the guide pan inclosing the ribs and tensioned flanges at the upper edges of the guide pan extending into the rib grooves.

4. In a vegetable grater, a frame, a hopper receptacle, guide pan and grating cylinder detachably mounted thereon, means for rotating the grating cylinder, said frame including a lateral arched bracket, an upstanding rectangular frame carried thereby for the removable reception of the hopper receptacle, said grating cylinder including a journalled stub shaft supporting the grating cylinder at one end and the rotating means at the other end, companion lugs carried by the frame and bracket for securing the bracket to the frame, a slidable tensioned connection between the bracket and guide pan including side ribs carried by the bracket having slots in the inner edges, channel bars carried by the guide pan inclosing the ribs, tensioned flanges at the upper edges of the guide pan extending into the rib grooves, and the lugs carried by the frame having slots receiving the adjacent corner edges of the guide pan.

In testimony whereof I affix my signature.

THOMAS LENGYEL.